United States Patent [19]
Kim et al.

[11] Patent Number: 5,981,617
[45] Date of Patent: Nov. 9, 1999

[54] IRRADIATION OF GAS PERMEABLE CONTACT LENSES BY FAR INFRARED LIGHT

[76] Inventors: Hee Jung Kim, 221-1 Hyonsung-Dong, Gaeyang-Gu, Ichon City; Sang Chul Park, #101, Banposadong 612-31, Seochogu, Seoul; Myoung Soo Shin, Shin Dong Bang, Ltd., 4 Ga 2, YongPyung-Dong, Youngdongpo-Gu, Seoul, all of Rep. of Korea

[21] Appl. No.: 09/008,791

[22] Filed: Jan. 20, 1998

[51] Int. Cl.$^6$ ...................................................... C08F 3/28
[52] U.S. Cl. ........................ 522/182; 522/120; 523/106; 523/107; 523/108
[58] Field of Search .................................... 522/120, 182; 523/106, 107, 108

[56] References Cited

U.S. PATENT DOCUMENTS

| | | | |
|---|---|---|---|
| 4,822,864 | 4/1989 | Chen | 526/279 |
| 5,258,490 | 11/1993 | Chang | 528/488 |
| 5,583,163 | 12/1996 | Müller | 523/108 |
| 5,610,252 | 3/1997 | Bambury et al. | 526/279 |
| 5,621,018 | 4/1997 | Chabreek | 523/108 |

*Primary Examiner*—Morton Foelak
*Attorney, Agent, or Firm*—Eugene Oak, Ph.D.,J.D.

[57] ABSTRACT

A multi-step process that yields a gas permeable contact lens that is more comfortable to wear due to an increased amount of moisture retention between the cornea and the lens and that also provides an increased amount of oxygen to the cornea to prevent the many potential problems occurring due to insufficient oxygen in the cornea area. The process entails exposure of the concave side of a gas permeable contact lens to far infrared light, thereby creating an electron deficiency on the concave side of the lens (the side which contacts the cornea). This electron deficiency drives a surface reaction upon the lens that produces water and oxygen as products, thereby providing the oxygen and moisture. Subsequent steps in the process are similar, although each subsequent exposure results in greater electron depletion of the concave side of the contact lens, thereby causing the contact lens to be increasingly effective in retaining moisture and oxygen with each additional exposure.

2 Claims, No Drawings

IRRADIATION OF GAS PERMEABLE CONTACT LENSES BY FAR INFRARED LIGHT

BACKGROUND OF THE INVENTION

1. Field of the Invention

The present invention pertains to chemical processes that improve contact lenses, and specifically to a process that yields gas permeable contact lenses which serve as a surface site for a chemical reaction that yields water and oxygen, thereby enriching and lubricating the area between the contact lens and the eye.

2. Description of the Prior Art

Gas permeable contact lenses replaced hard lenses because they allow gases such as oxygen to pass through the plastic. Although one of the most noticeable features of gas permeable lenses is that they do not typically break or tear as easily as soft contact lenses, one of the primary beneficial features of these types of lenses are their gas permeability, hence their name. Allowing sufficient amounts of oxygen to pass through the lenses to the cornea of the wearer helps eliminate several problems that afflict soft lens and ordinary hard lens wearers, such as Corneal edema (swelling of the cornea), etc. In addition, some other applications and benefits of gas permeable contact lenses include: correction of special vision problems, post-surgical treatment, superior visual acuity and health benefits afforded by the lenses.

Prior art pertaining to gas permeable contact lenses include the following. U.S. Pat. No. 4,822,864 to Chen discloses a gas permeable contact lens and method and materials for its manufacture. U.S. Pat. No. 5,610,252 to Bambury et al. discloses vinyl carbonate and vinyl carbamate contact lens material monomers. U.S. Pat. No. 5,258,490 to Chang discloses a non-irritating soft gas permeable contact lens and process for producing same. None of the prior art teach a process for producing gas permeable contact lenses similar to the process of the present invention.

Consequently, the primary object of the present invention is to provide a process that produces gas permeable contact lenses that have increased oxygen permeability and flow through the lenses, as well as increased moisture between the lens and the cornea.

SUMMARY OF THE INVENTION

The present invention comprises a multi-step process that yields a gas permeable contact lens that is more comfortable to wear due to an increased amount of moisture retention between the cornea and the lens, and which also provides an increased amount of oxygen to the cornea to prevent the many potential problems occurring due to insufficient oxygen in the cornea area. The process entails exposure of the concave side of a gas permeable contact lens to far infrared light, thereby creating an electron deficiency on the concave side of the lens (the side which contacts the cornea). This electron deficiency drives a surface reaction upon the lens which produces water and oxygen as products, thereby providing the oxygen and moisture. Subsequent processes are similar, although each subsequent exposure results in greater electron depletion of the concave side of the contact lens, thereby causing the contact lens to be increasingly effective in retaining moisture and oxygen with each additional exposure.

Applications for gas permeable contact lenses and gas permeable contact lens cleaning solutions are numerous and in virtually all applications where gas permeable contact lenses are used, the present invention can be substituted to yield superior results.

These together with other objects of the invention are explained clearly in the claims annexed to and forming a part of this disclosure. For a better understanding of the invention, its operating advantages and the specific objects attained by its use, reference should be made to the accompanying descriptive matter in which there are described preferred embodiments of the invention.

DETAILED DESCRIPTION OF THE PREFERRED EMBODIMENT

The present invention is a multi-step process that comprises a plurality of batch processes, wherein the product yielded from a step in the overall process is then successively used as the feed for the subsequent batch process.

The first batch process involves the exposure of the concave side of a gas permeable contact lens to far infrared light, the concave side of the lens being the side which contacts the cornea of the wearer. The exact duration of the exposure may vary and the effects of the far infrared light upon the lenses are proportional to the duration of exposure. This step yields a lens with an electron deficiency on the concave side of the lens, which becomes the driving force of the following reaction:

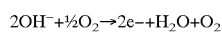

Therefore, this irradiation of far infrared light induces an electron deficiency on a particular side of the contact lens, wherein when the lens is worn, the above surface reaction takes place, thus producing water and oxygen, as well as electrons, in order to fulfill the deficiency.

The second batch process comprises a second exposure of the product of the first batch process to far infrared light. At the conclusion of this second exposure, the gas permeable contact lens will be energized in such a way that the contact lens has a greater rate of reaction and the above reaction occurs at a higher rate.

What is claimed to be new and therefore desired to be protected by Letters Patent of the united states is as follows:

1. A process for manufacturing a gas permeable contact lens with increased oxygen flow and moisture retention, comprising:
    a) a gas permeable contact lens having a concave inner surface and an convex outer surface;
    b) exposure of said concave inner side of said gas permeable contact lens to far infrared light.

2. A process for manufacturing a gas permeable contact lens with increased oxygen flow and moisture retention as mentioned in claim 1, wherein said concave inner side of said gas permeable contact lens is subjected to a plurality of successive exposures of varying wavelengths of far infrared light.

* * * * *